Figure 1:
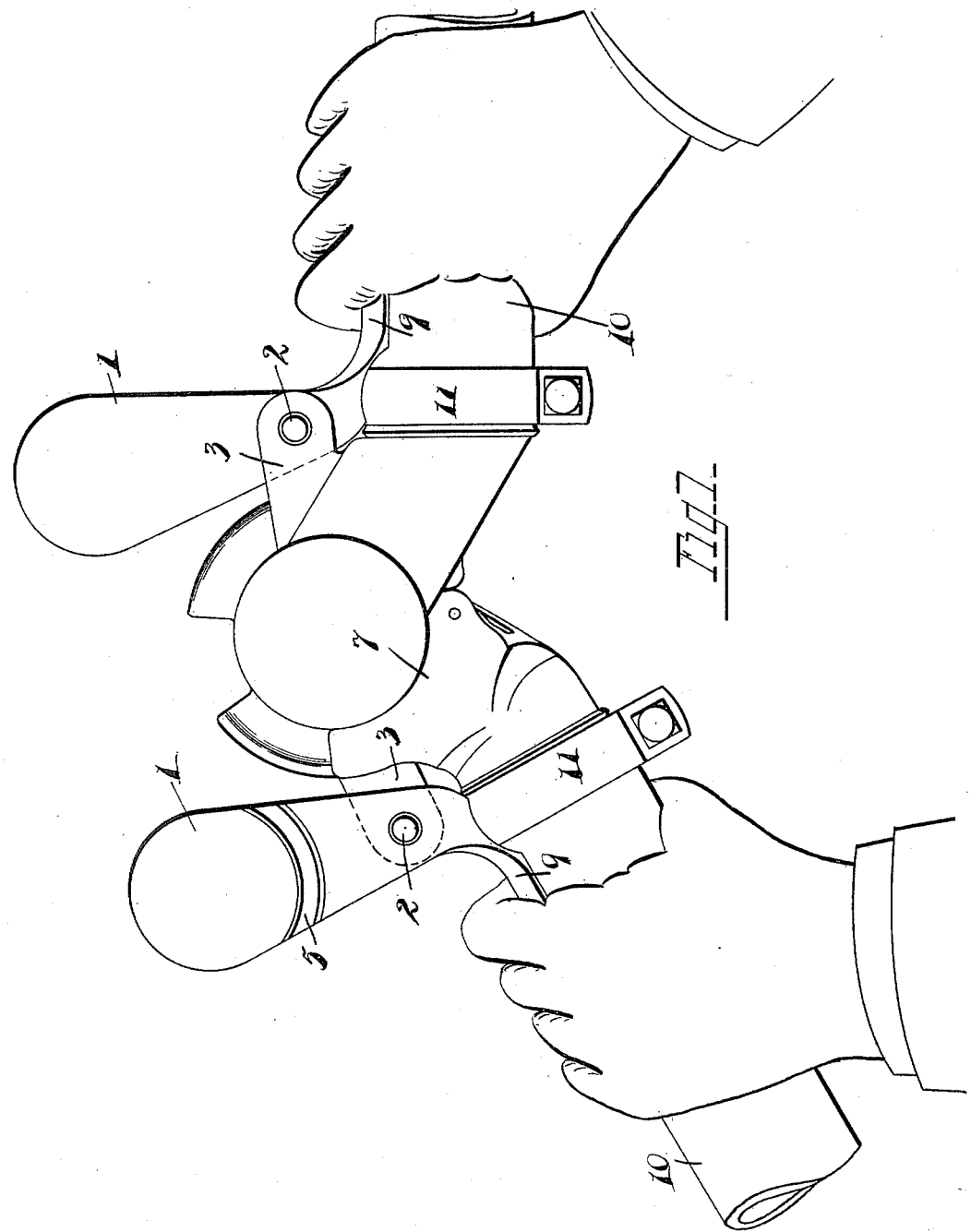

(No Model.) 3 Sheets—Sheet 1.
W. H. STARK.
DUST GUARD FOR HOSE COUPLINGS.
No. 600,386. Patented Mar. 8, 1898.

WITNESSES
Carroll J. Webster
Carl H. Keller.

INVENTOR
William H. Stark
By William Webster
Atty (No Model.) 3 Sheets—Sheet 2.
W. H. STARK.
DUST GUARD FOR HOSE COUPLINGS.
No. 600,386. Patented Mar. 8, 1898.
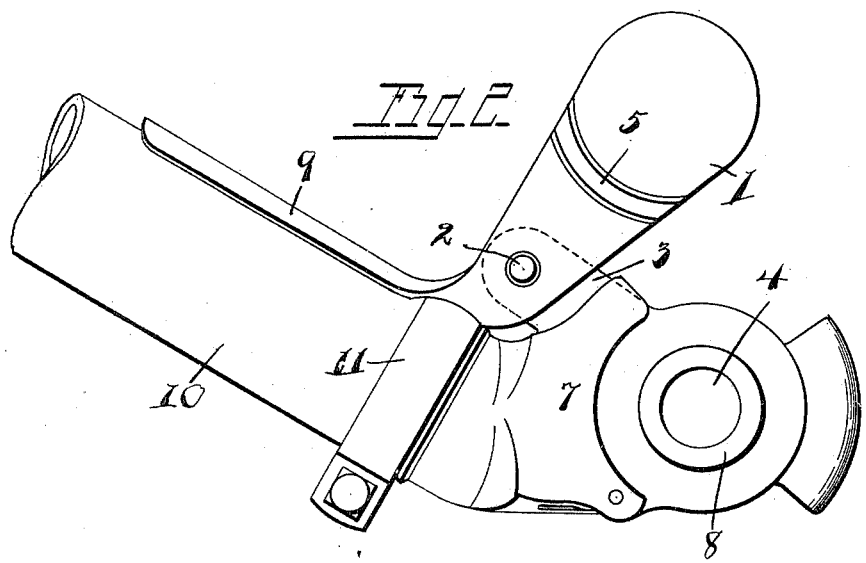
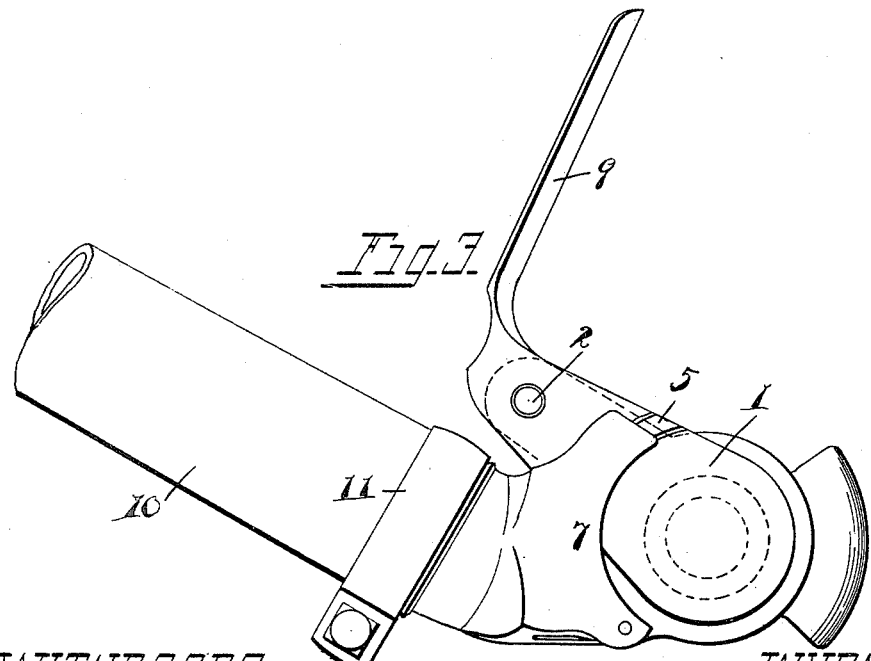
WITNESSES
Carroll J. Webster
Carl H. Keller
INVENTOR
William H. Stark
By William Webster
Atty (No Model.) 3 Sheets—Sheet 3.
W. H. STARK.
DUST GUARD FOR HOSE COUPLINGS.
No. 600,386. Patented Mar. 8, 1898.
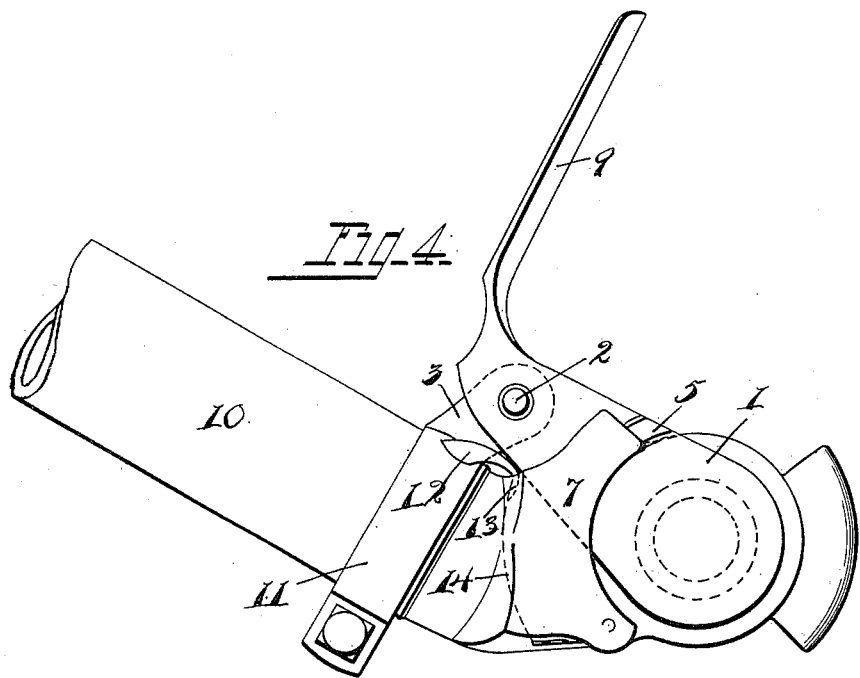
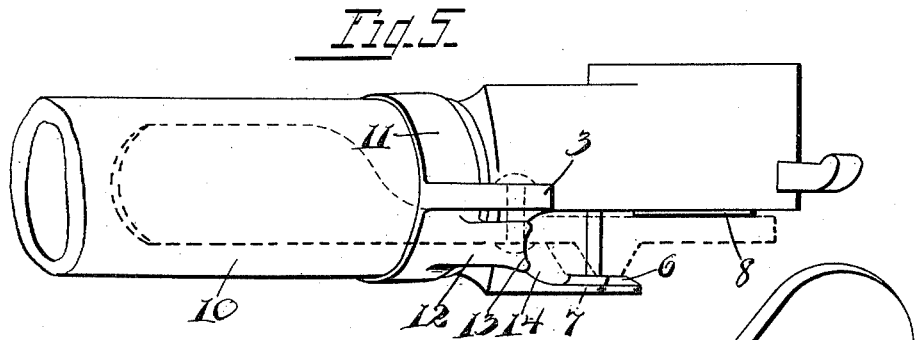
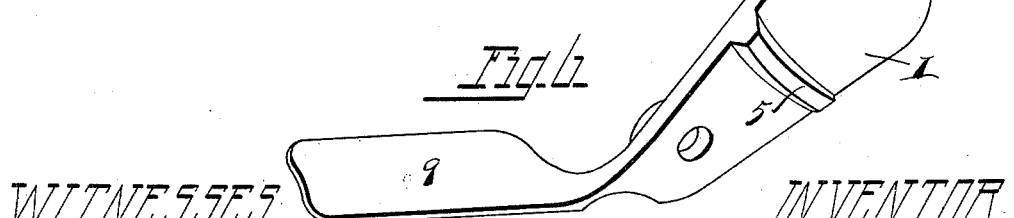
WITNESSES
Carroll J. Webster
Carl H. Keller
INVENTOR
William H. Stark
By William Webster
Atty

UNITED STATES PATENT OFFICE.

WILLIAM H. STARK, OF TOLEDO, OHIO, ASSIGNOR TO J. J. MANNING, TRUSTEE, OF SAME PLACE.

DUST-GUARD FOR HOSE-COUPLINGS.

SPECIFICATION forming part of Letters Patent No. 600,386, dated March 8, 1898.

Application filed September 21, 1896. Serial No. 606,488. (No model.)

*To all whom it may concern:*

Be it known that I, WILLIAM H. STARK, of Toledo, county of Lucas, and State of Ohio, have invented certain new and useful Improvements in Dust-Guards for Hose-Couplings; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to a dust-guard for hose-couplings of that character to be carried by the coupling-sections of the hose and to be out of the way during the operation of coupling two sections of hose together, and which effectually closes the orifice leading into the coupling-sections automatically when the coupling-sections are uncoupled and the hose is in a normal suspended position.

The object of the invention is as follows: to provide a dust-guard for hose-coupling which, when the hose is uncoupled shall, by the force of gravity, automatically close the orifice leading into the coupling-sections and be forced against the packing surrounding the orifice, whereby a tight joint is effected, thereby preventing dust, &c., from entering the orifice and the coupling-pipes, and being carried with the air when the brake is in operation into the delicate mechanism of the brake, also preventing snow, ice, &c., from entering the orifice, stopping up the same, and preventing a free passage of air when the hose is coupled and in operation and the accumulation of snow, ice, &c., upon the face of the packing-rings, which must be removed to effect a tight coupling between the two coupling-sections; in providing a handle, whereby when two sections of hose are being coupled together by the operation of grasping the hose now necessary to couple the coupling-sections, the handle shall be in a convenient position to be grasped with the hose, whereby the guard is revolved from engagement over the orifice and removed to a degree to admit of the sections being assembled together; and to provide means for pivoting the dust-guard to the coupling-sections, either adaptable to a coupling-section provided as an article of manufacture, especially constructed for the reception of the dust-guard, or in the application of the dust-guard to the coupling-sections already in use.

The invention therefore consists in a coupling-section having a plate pivotally secured thereto of a weight, when the coupling-section and hose are in a normally-suspended position, to close the orifice leading into the coupling-section, the plate having an inclined rib upon one side, which engages with a rib upon the coupling-section to force the plate against the packing surrounding the orifice in the coupling-section, whereby a tight joint is effected between the plate and the packing.

The invention further consists in providing a handle projecting at an angle to the plate, whereby when the handle is moved to a plane parallel with the hose, so as to be grasped with the hose in the act of coupling or uncoupling two sections of hose, the guard is removed from the sections out of the way during these operations.

The invention further consists in the parts as hereinafter shown, described, and claimed.

In the drawings, Figure 1 is a side elevation of two sections of hose provided with my improved dust-guard, the coupling-sections being illustrated in the act of coupling, the dust-guards being raised. Fig. 2 is a side elevation of a coupling-section provided with my improved dust-guard constructed and arranged in accordance with my invention, the dust-guard being illustrated as raised into the position occupied in coupling two sections of the coupling together. Fig. 3 is a like view, the dust-guard being illustrated as in position to seal the orifice leading into the coupling-section. Fig. 4 is a view similar to Fig. 2 illustrating a modification which consists in forming a lug upon the band employed to secure the hose to the coupling-section, this construction being adaptable to the coupling-sections already in use. Fig. 5 is a top plan view of the coupling-section illustrated in Fig. 3, the dust-guard being shown in dotted lines. Fig. 6 is a perspective view of the dust-guard plate.

Heretofore in the branch of the art to which my invention pertains it has been usual after two sections of hose have been disconnected from each other, in order to preclude dust, &c., from entering the orifice in the coupling-section, to secure the coupling-section when not in use to a dummy permanently attached to the end of the car, the dummy having a face against which the coupling-section abuts to close the orifice. The disadvantage arising from the use of the dummy is that it is necessary to twist the hose into a U shape, which stretches the fiber and kinks the hose, which stretching and kinking has a tendency to make a weak spot in the hose and render the hose of short life. For this reason a good many of the railroads have discontinued the use of the dummy and allowed a hose and coupling-section carried thereby to rest in a normal suspended position.

My invention has for its object to provide a dust-guard secured to the coupling-section to close the orifice when the hose is suspended, and consists in a guard-plate 1, pivotally secured at 2 to an ear 3, carried by the hose or coupling-section. The plate 1 swings in the arc of a circle and is of a length and size, when in position, to cover the orifice 4, leading into the coupling-section. An inclined rib 5 upon the outer face of the plate 1, being in the path of travel of the inner rib 6 of the arm 7 of the coupling-section, forces the plate, when in operation, against the annular packing 8 which surrounds the orifice 4 in the coupling-section, it being understood that the coupling-section is of the construction now employed and that no change is made therein.

9 designates the handle, integral with the plate 1, which projects therefrom at an angle, so that when the plate covers the orifice 4 the handle projects upwardly in the position shown in Figs. 2 and 3, and when the handle is brought to a position adjacent to and parallel with the hose 10 the plate is removed to a degree to allow the two sections of the coupling to be secured together. For convenience in handling the hose in coupling and uncoupling two sections of the coupling the handle is preferably made circular in cross-section of a diameter equal to the diameter of the circumference of the hose, whereby the handle, when in engagement, does not materially increase the size of the hose. Where it is desired to employ the dust-guard upon coupling-sections especially built for their use, the ears 3 are cast integral therewith, as shown in Figs. 1 and 2. Where, however, it is desired to apply the dust-guard to the coupling already in use, the ears are integral therewith and form a part of the bands 11, which secure the hose upon the coupling-section; or, if desired, any band may be employed which encircles the hose or neck of the coupling-section, it being necessary to provide a projection 12, extending to one side of the band, the end of the projection being bent, as at 13, to engage with the rear wall 14 of the orifice formed between the body of the coupling-section and the arm 7. By means of the projection 12 the bands 11 are so guided as to always be in the same position relative to the coupling-section, whereby the relative positions of the pivotal point 2 and the orifice 4 from each other remain the same.

What I claim is—

1. In a dust-guard for hose-couplings, a coupling-section, a dust-guard pivotally secured thereto moving in a plane parallel with the face of the coupling-section and in its closing operation being forced progressively laterally against the face of the coupling-section.

2. In a dust-guard for hose-couplings, a coupling-section, a pivoted dust-guard operating in the same plane as the face of the orifice and closed automatically by gravitation, means for holding the dust-guard against the face of the coupling-section, and a handle projecting from the dust-guard at an angle thereto, whereby when the handle is in a plane parallel with the hose, the dust-guard is raised above the coupling-section.

3. In a dust-guard for hose-couplings, a coupling-section, a hose secured thereto by a band, an ear projecting upwardly from the band, and a weighted dust-guard pivotally secured thereto, and means comprising a cam upon the dust-guard for forcing the dust-guard against the face of the coupling-section.

4. In a dust-guard for hose-couplings, a coupling-section, a hose, bands for securing the hose upon the coupling-section, an ear projecting above the band, a dust-guard pivotally secured thereto, a projection extending to one side of the band for engagement with the coupling-section to properly position the bands with reference to the coupling-sections.

5. In a dust-guard for hose-couplings, a coupling-section, a dust-guard pivotally arranged with reference thereto, and means comprising a cam-face upon the dust-guard for engagement with the coupling-section for holding the dust-guard against the face of the coupling-sections.

6. An automatic dust-guard for hose-couplings, consisting of the combination of the following elements: a coupling-section provided with a projecting cam-arm, a weighted dust-guard pivotally secured to the coupling-section and adapted to swing in a plane parallel to the face thereof, and be positioned between the face of the section and the cam-arm to cover the orifice, and means for retracting the dust-guard when the section is coupled to another, substantially as described.

In testimony that I claim the foregoing as my own I hereby affix my signature in presence of two witnesses.

WILLIAM H. STARK.

Witnesses:
H. DE WITT HOPKINS,
R. R. STREHLAU.